(12) United States Patent
Lee et al.

(10) Patent No.: US 7,243,934 B2
(45) Date of Patent: Jul. 17, 2007

(54) MULTI-LINK REAR SUSPENSION SYSTEM

(75) Inventors: Un-Koo Lee, Hwaseong (KR);
Sang-Ho Lee, Gunpo-si (KR);
Hyung-Bae Jang, Suwon-si (KR);
Young-Wook Park, Suwon-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 346 days.

(21) Appl. No.: 11/005,405

(22) Filed: Dec. 6, 2004

(65) Prior Publication Data
US 2005/0140110 A1 Jun. 30, 2005

(30) Foreign Application Priority Data
Dec. 6, 2003 (KR) ............... 10-2003-0088383
Jun. 25, 2004 (KR) ............... 10-2004-0048127

(51) Int. Cl.
*B60G 3/12* (2006.01)
(52) U.S. Cl. .................. 280/124.128; 280/124.135; 280/124.133
(58) Field of Classification Search ......... 280/124.109, 280/124.128, 124.135, 124.141
See application file for complete search history.

(56) References Cited

U.S. PATENT DOCUMENTS

| | | | |
|---|---|---|---|
| 4,740,012 A | | 4/1988 | Kondo et al. |
| 5,100,165 A | * | 3/1992 | Hespelt ............... 280/124.141 |
| 5,685,556 A | * | 11/1997 | Shibue et al. ......... 280/124.128 |
| 5,692,767 A | * | 12/1997 | Kato ................... 280/124.142 |
| 5,851,016 A | * | 12/1998 | Kawagoe et al. ...... 280/124.148 |
| 6,076,841 A | * | 6/2000 | Satou et al. .......... 280/124.179 |
| 6,240,806 B1 | * | 6/2001 | Morris et al. ................ 74/567 |
| 6,241,267 B1 | * | 6/2001 | Dziadosz et al. ...... 280/124.134 |
| 6,357,772 B1 | * | 3/2002 | Pelz et al. ............. 280/124.143 |
| 6,612,593 B2 | * | 9/2003 | Mikasa et al. ......... 280/86.758 |
| 6,719,314 B1 | * | 4/2004 | Schote ................ 280/124.135 |
| 6,752,409 B1 | * | 6/2004 | Kunert ................ 280/124.138 |
| 6,755,429 B1 | * | 6/2004 | Buchwitz et al. ...... 280/124.109 |
| 6,764,084 B1 | * | 7/2004 | Nakamura et al. ..... 280/93.512 |
| 6,877,754 B2 | * | 4/2005 | Kim ................... 280/124.109 |
| 7,131,653 B2 | * | 11/2006 | Asteggiano .......... 280/124.128 |
| 2005/0275183 A1 | * | 12/2005 | Amano ................ 280/124.128 |
| 2006/0071441 A1 | * | 4/2006 | Mathis ................ 280/124.128 |

FOREIGN PATENT DOCUMENTS

| | | |
|---|---|---|
| DE | 3048794 | 8/1982 |
| DE | 69702235 T | 12/2000 |
| WO | WO 98/38055 | 9/1998 |

* cited by examiner

*Primary Examiner*—Eric Culbreth
*Assistant Examiner*—Karen J. Amores
(74) *Attorney, Agent, or Firm*—Morgan Lewis & Bockius LLP

(57) ABSTRACT

A knuckle is minimized in size to be located in an internal space of a rear wheel. An upper arm is disposed lower than a conventional double wishbone type and one end of the upper arm is secured to the knuckle. A shock absorber couples at a lower end thereof to the knuckle by passing through a space between a lower arm and assist arm. This configuration thus constructed greatly increases the space of the trunk room, reduces noise by minimizing the transmission of road impact and vibration, and improves ride comfort as well as braking stability and turn stability.

11 Claims, 9 Drawing Sheets

<Braking while the vehicle is in motion>

MULTI-LINK REAR SUSPENSION SYSTEM

CROSS-REFERENCE TO RELATED APPLICATIONS

The present application is based on, and claims priority from, Korean Application Serial Numbers 10-2003-0088383 and 10-2004-0048127, filed on Dec. 6, 2003 and Jun. 25, 2004, the disclosures of which are hereby incorporated by reference herein in its entirety.

FIELD OF THE INVENTION

The present invention relates to a rear suspension system having a multi-link configuration.

BACKGROUND OF THE INVENTION

In a multi-link rear suspension system, an upper arm is generally directly coupled to a rear wheel house panel. However, the coupling portion of the upper arm and rear wheel house panel takes up a lot of room in the trunk room. Furthermore, the road shocks directly transmitted toward the vehicle body through the upper arm increases noise in the passenger compartment and deteriorates ride comfort.

Thus, vehicles employing the multi-link rear suspension system have recently been developed to maximize the space of the trunk room, reduce noise, and improve vehicle ride.

SUMMARY OF THE INVENTION

Embodiments of the present invention are provided to effectively obtain sufficient space in the trunk room and simultaneously reduce noise and improve the ride comfort of the vehicle.

A multi-link rear suspension system includes a knuckle disposed at an internal space of a rear wheel. A rear subframe is positioned along a width direction of the vehicle and increases stiffness of a lower portion of the vehicle body by being coupled to the vehicle body. An upper arm is disposed at one end thereof in the internal space of the rear wheel for being coupled to an upper end of the knuckle. The other end of the upper arm couples to the rear subframe. A lower arm is placed underneath the upper arm. One end of the lower arm is positioned at the internal space of the rear wheel to be coupled with the knuckle while the other end is coupled to a lower portion of the rear subframe. An assist arm is located toward the front of the vehicle body in relation to the rear subframe. One end of the assist arm couples to the knuckle and the other end couples to the rear subframe. A trailing arm is underneath the assist arm along the anteroposterior direction of the vehicle body. One end of the trailing arm couples to the knuckle while the other end of the trailing arm couples to the vehicle body. A coil spring is fixed at the lower end thereof by being inserted into a fixing groove formed on the lower arm. The upper end of the coil spring couples to the vehicle body. A shock absorber is slopedly disposed at a predetermined offset angle ($\theta 1$) from a central axis that passes through the center of the rear wheel in a vertical direction in relation to the roadway. The lower end of the shock absorber couples to the knuckle by passing through a space between the lower arm and the assist arm. The upper end of the shock absorber couples to the vehicle body.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
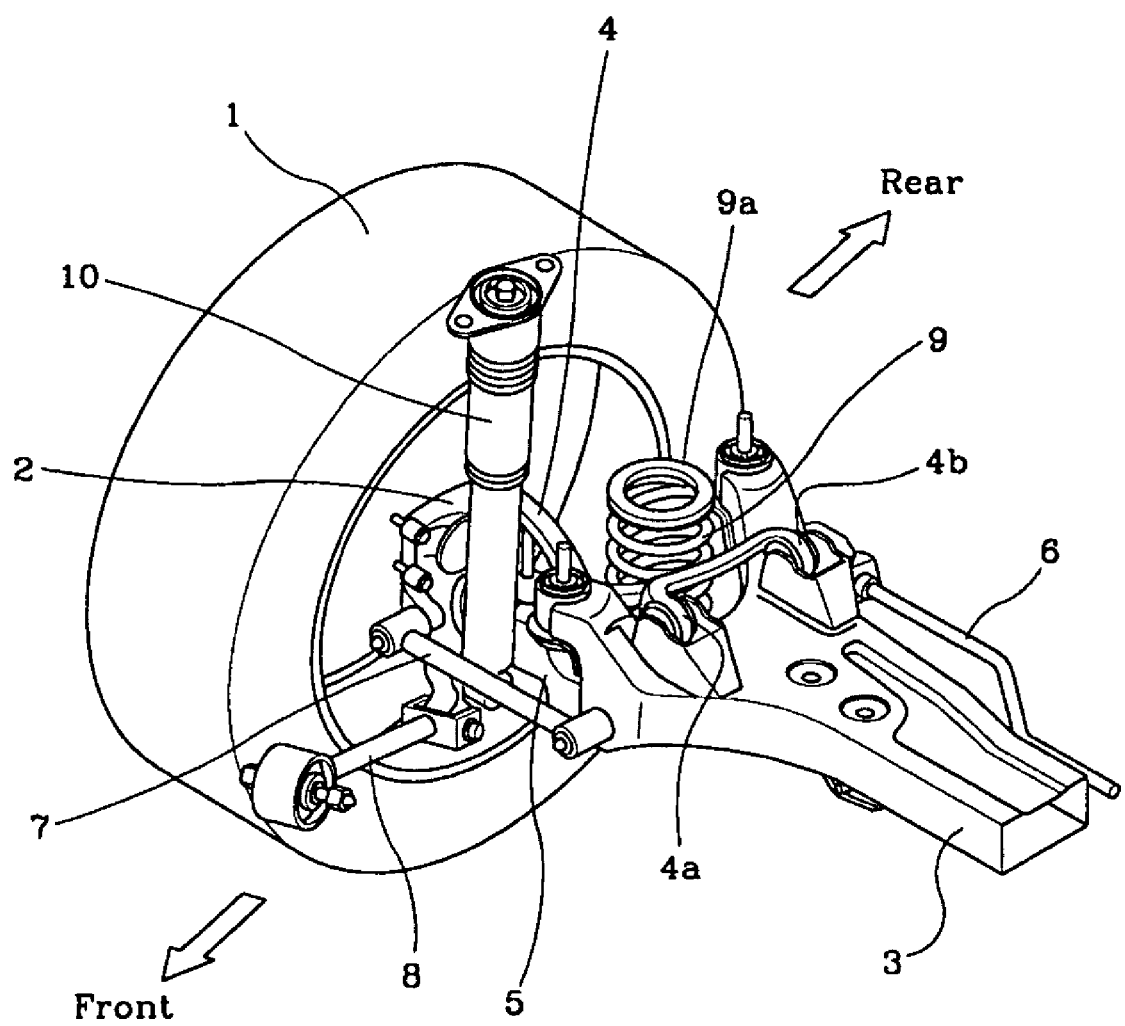
FIG. 1 is a perspective view of a multi-link rear suspension system according to an embodiment of the present invention.
Figure 2:
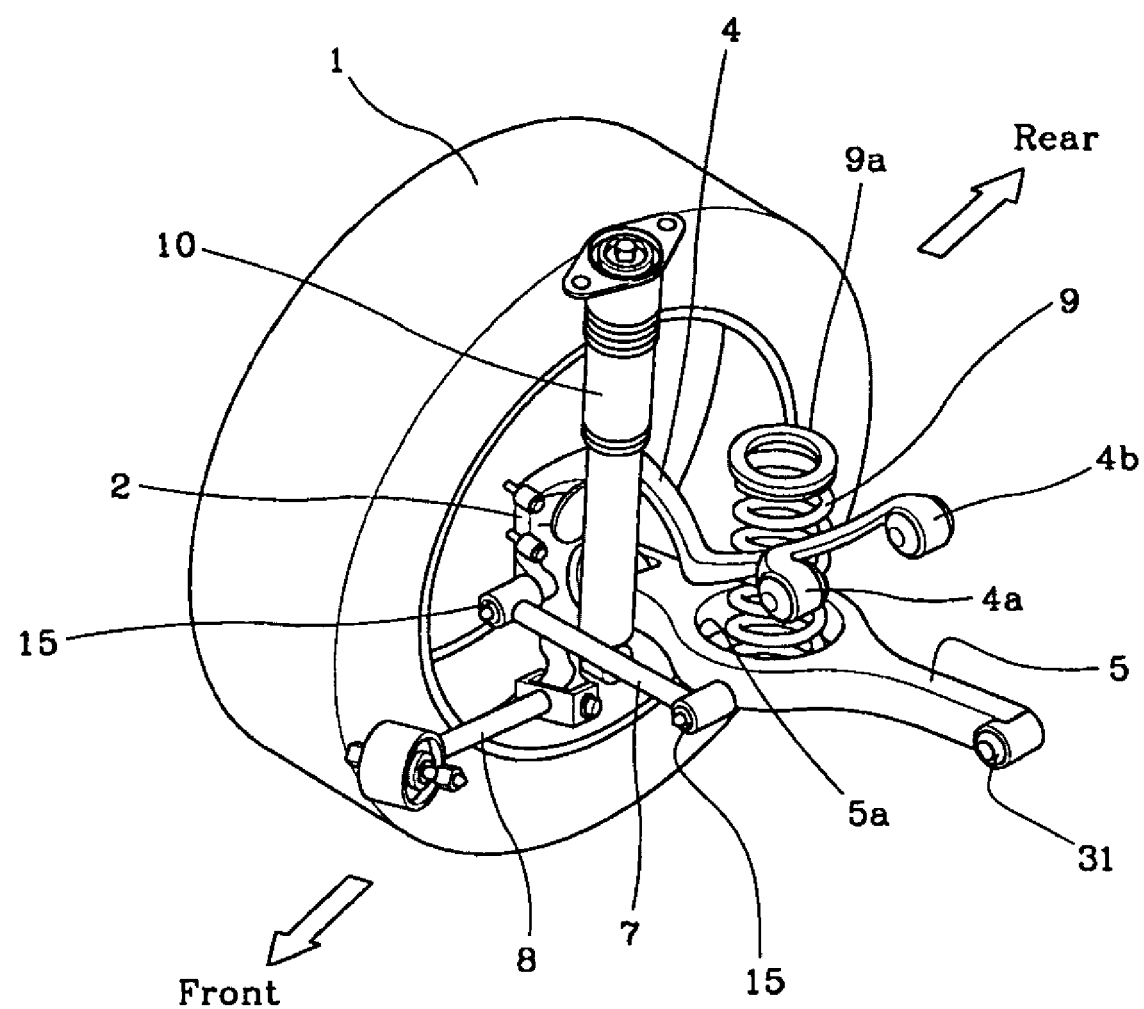
FIG. 2 is the perspective view of FIG. 1 without a rear subframe.

Referring now to FIGS. 1 to 5, a multi-link rear suspension system according to an embodiment of the present invention includes a knuckle 2, rear subframe 3, upper arm 4, lower arm 5, stabilizer 6, assist arm 7, trailing arm 8, coil spring 9, and shock absorber 10.

Figure 3:
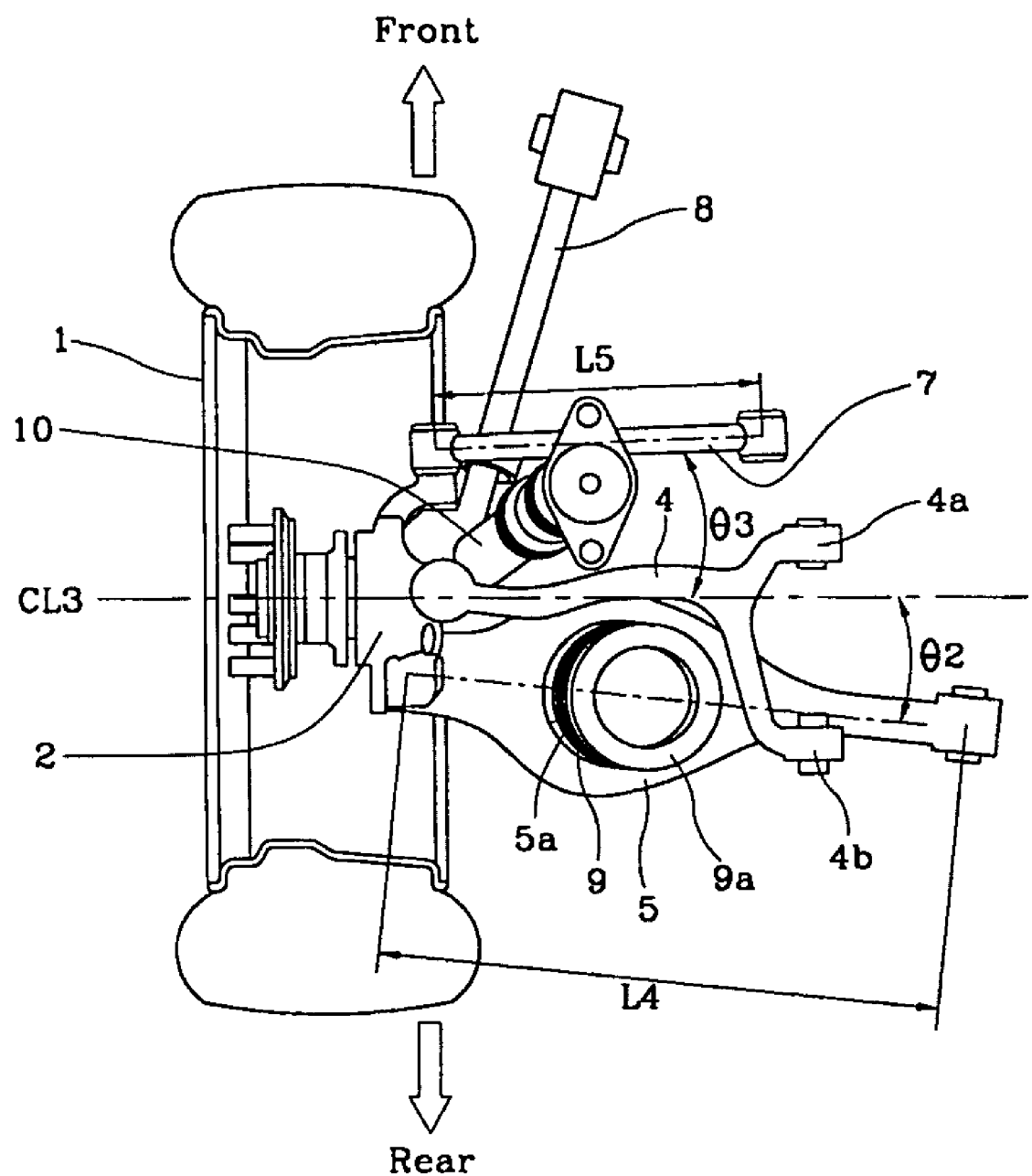
FIG. 3 is a top view of FIG. 2.
Figure 4:
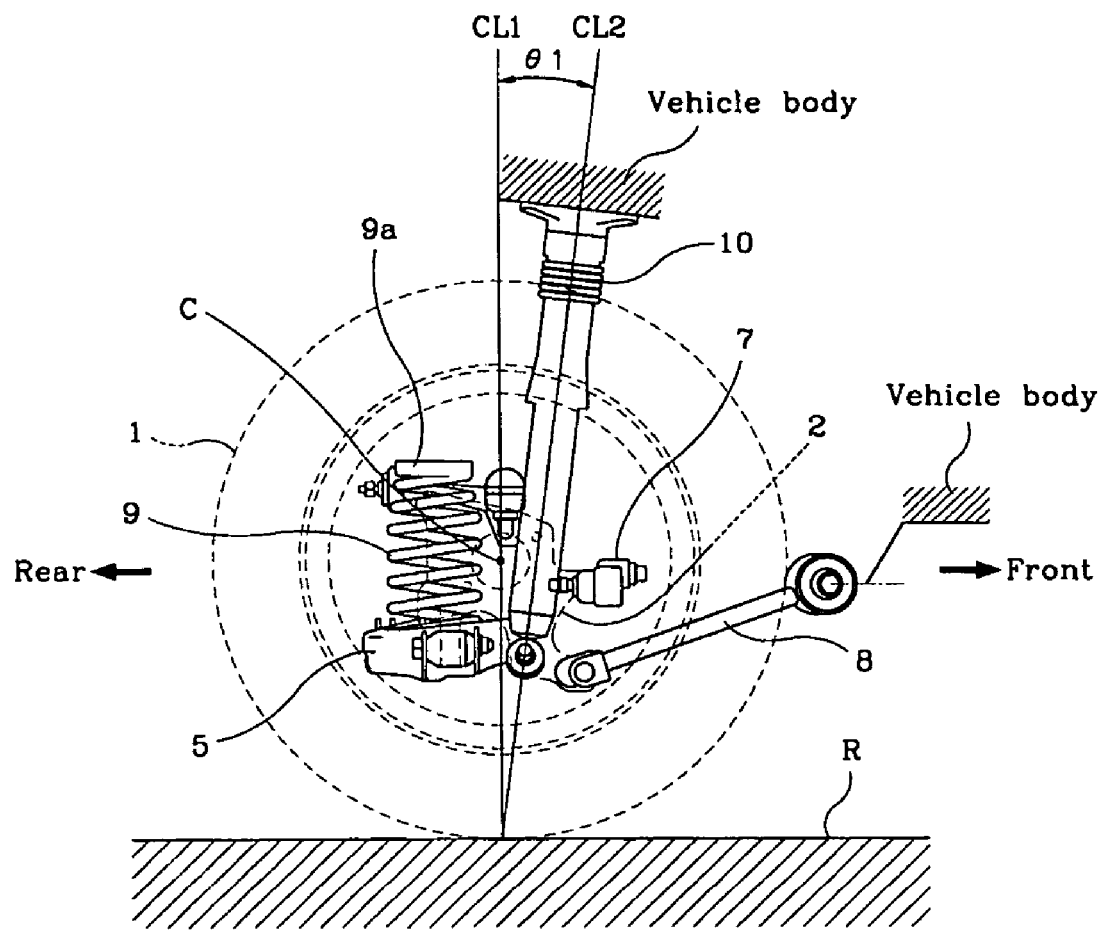
FIG. 4 illustrates a rear wheel for depicting the mounting state of a shock absorber in a multi-link rear suspension system according to an embodiment of the present invention.
Figure 5:
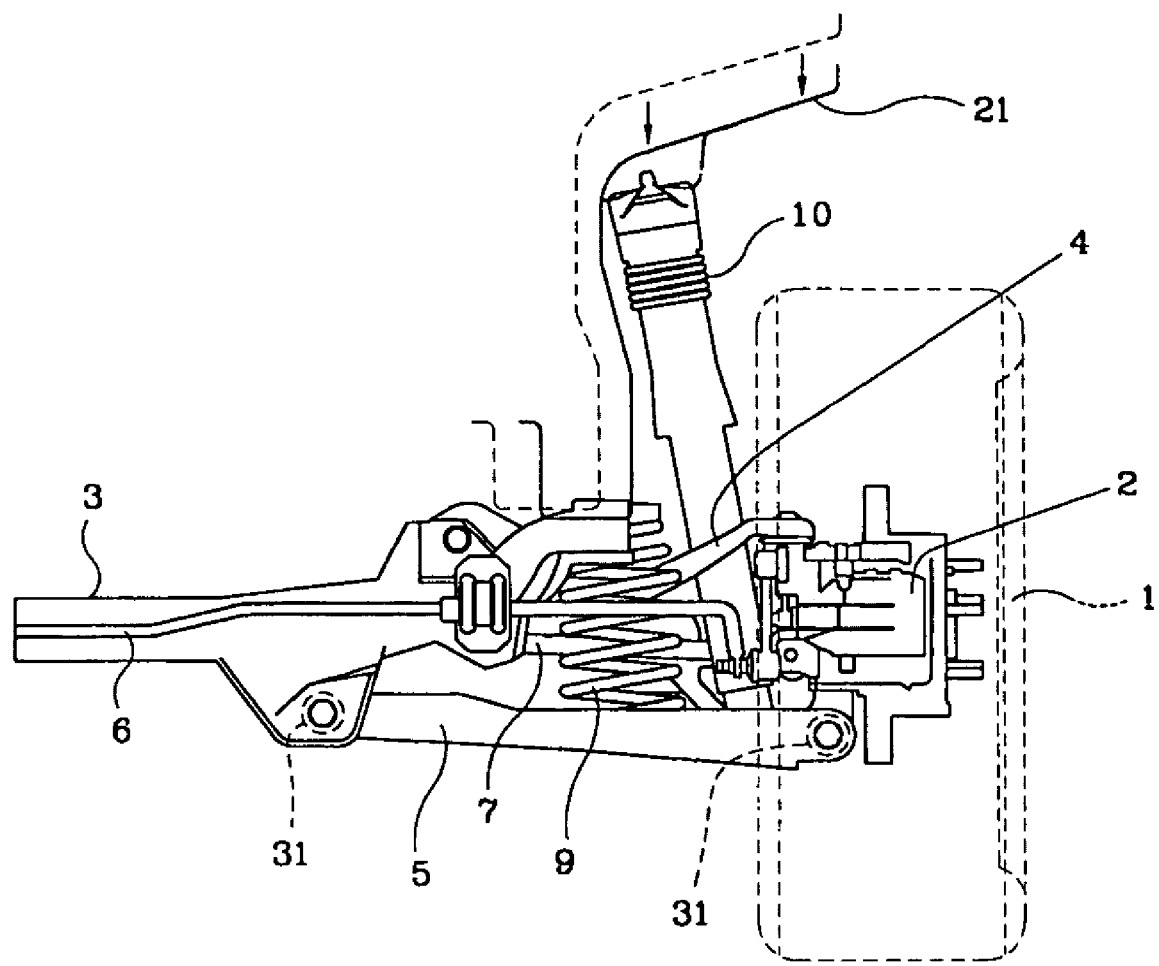
FIG. 5 is a rear elevation when observing FIG. 1 from the rear of the vehicle.

Knuckle 2 is disposed at an internal space of a rear wheel 1. As illustrated in FIGS. 3 and 5, knuckle 2 is within rear wheel 1 and is mostly prevented from being exposed from rear wheel 1.

Rear subframe 3 positioned along a width direction of the vehicle increases stiffness of a lower portion of the vehicle body by being coupled at both ends thereof to the vehicle body either directly or via a bushing.

Upper arm 4 is disposed at one end thereof in the internal space of rear wheel 1 for being coupled to an upper end of knuckle 2 via a ball joint. The other end of upper arm 4 couples to rear subframe 3 via a bushing.

Lower arm 5 is placed underneath upper arm 4. One end of lower arm 5 is positioned at the internal space of rear wheel 1 to couple with a lower end of knuckle 2 via a lower arm mounting bushing 31 while the other end couples to a lower portion of rear subframe 3 via a lower arm mounting bushing 31.

Stabilizer 6 is in close proximity to a lateral side of rear subframe 3 toward the rear of the vehicle and is parallel to rear subframe 3 along a vehicle width direction. Both ends of stabilizer 6 couple to both knuckles 2 via bushings.

Assist arm 7 is positioned toward the front of the vehicle body in relation to rear subframe 3. One end of assist arm 7 couples to knuckle 2 via an assist arm mounting bushing 15 and the other end couples to a lateral side of rear subframe 3 via assist arm mounting bushing 15.

Trailing arm 8 is underneath assist arm 7 along the anteroposterior direction of the vehicle body and one end thereof couples to knuckle 2 via a bushing. The other end of trailing arm 8 couples to the vehicle body via a bushing.

Coil spring 9 is fixed at a lower end thereof by being inserted into a fixing groove 5a formed on lower arm 5. The upper end of coil spring 9 couples to the vehicle body via a spring seat 9a.

Shock absorber 10 is slopedly disposed at a predetermined offset angle ($\theta 1$) from a central axis that passes through the center (C) of rear wheel 1 in a vertical direction in relation to the roadway (R). The lower end of shock absorber 10 passes through a space between lower arm 5 and assist arm 7 and couples to a lower end of knuckle 2. The upper end of shock absorber 10 couples to the vehicle body (CL2 refers to a central axis of shock absorber 10).

One end of upper arm 4 coupling to rear subframe 3 branches out to a front end 4a and rear end 4b. Front and rear ends 4a and 4b are fixed to rear subframe 3 via bushings.

Shock absorber 10 is tilted toward the front of the vehicle at an offset angle ($\theta 1$).

A linear length (L4) connecting the centers of both ends of lower arm 5 is formed longer than a linear length (L5) connecting the centers of both ends of assist arm 7.

Lower arm 5 is mounted in such a way that one end coupling to a lower portion of rear subframe 3 is in a shifted state toward the back of the vehicle body compared to the other end thereof coupling to knuckle 2 in relation to a central axis (CL3) connecting the centers of rear wheels 1 in a lateral direction of the vehicle.

A predetermined offset angle ($\theta 2$) is formed between central axis (CL3) and a line connecting both ends of lower arm 5.

Assist arm 7 is mounted in such a way that one end coupling to a lateral side of rear subframe 3 is in a shifted state toward the front of the vehicle body compared to the other end coupling to knuckle 2 in relation to a central axis (CL3) connecting the centers of rear wheels 1 in the lateral direction of the vehicle.

A predetermined offset angle ($\theta 3$) is formed between central axis (CL3) and a line connecting both ends of assist arm 7.

Offset angle ($\theta 2$) of lower arm 5 in relation to the central axis (CL3) is preferably greater than offset angle ($\theta 3$) of assist arm 7 in relation to the central axis (CL3).

In the multi-link rear suspension system thus constructed, knuckle 2 is minimized in size to be placed in the internal space of rear wheel 1. Upper arm 4 is disposed lower than a conventional double wishbone type and one end of upper arm 4 is secured to knuckle 2. Shock absorber 10 couples at a lower end thereof to knuckle 2 by passing through a space between lower arm 5 and assist arm 7. A rear wheel house panel 21 forming a trunk room creates more space due to the shifted shock absorber 10 (see FIG. 5).

Thus, vehicles adopting the multi-link rear suspension system according to the embodiment of the present invention can have increased space in the trunk room.

One end of upper arm 4 is branched out to front end 4a and rear end 4b. Therefore, road shock, vibration and the like can be dispersed to front end 4a and rear end 4b.

The dispersion of road shock and vibration can prevent a concentrated stress at a certain portion of upper arm 4, thus increasing the durability of upper arm 4.

Upper arm 4 conventionally directly connected to the vehicle body is fixed to rear subframe 3 in the present invention. Thus, road impact, vibration and the like transmitted to upper arm 4 are greatly insulated while passing through rear subframe 3.

In case rear subframe 3 is coupled to the vehicle body via a bushing, noise reduction and ride comfort can effectively be improved.

Offset angle ($\theta 1$) of shock absorber 10 is minimized in the present invention, thereby improving ride comfort by enhancing response against external force of the road and increasing a damping function.

Coil spring 9 and shock absorber 10 are distantly located to disperse external force from the roadway to coil spring 9 and shock absorber 10, thereby minimizing shock transmission and improving vehicle ride.

Figure 6:
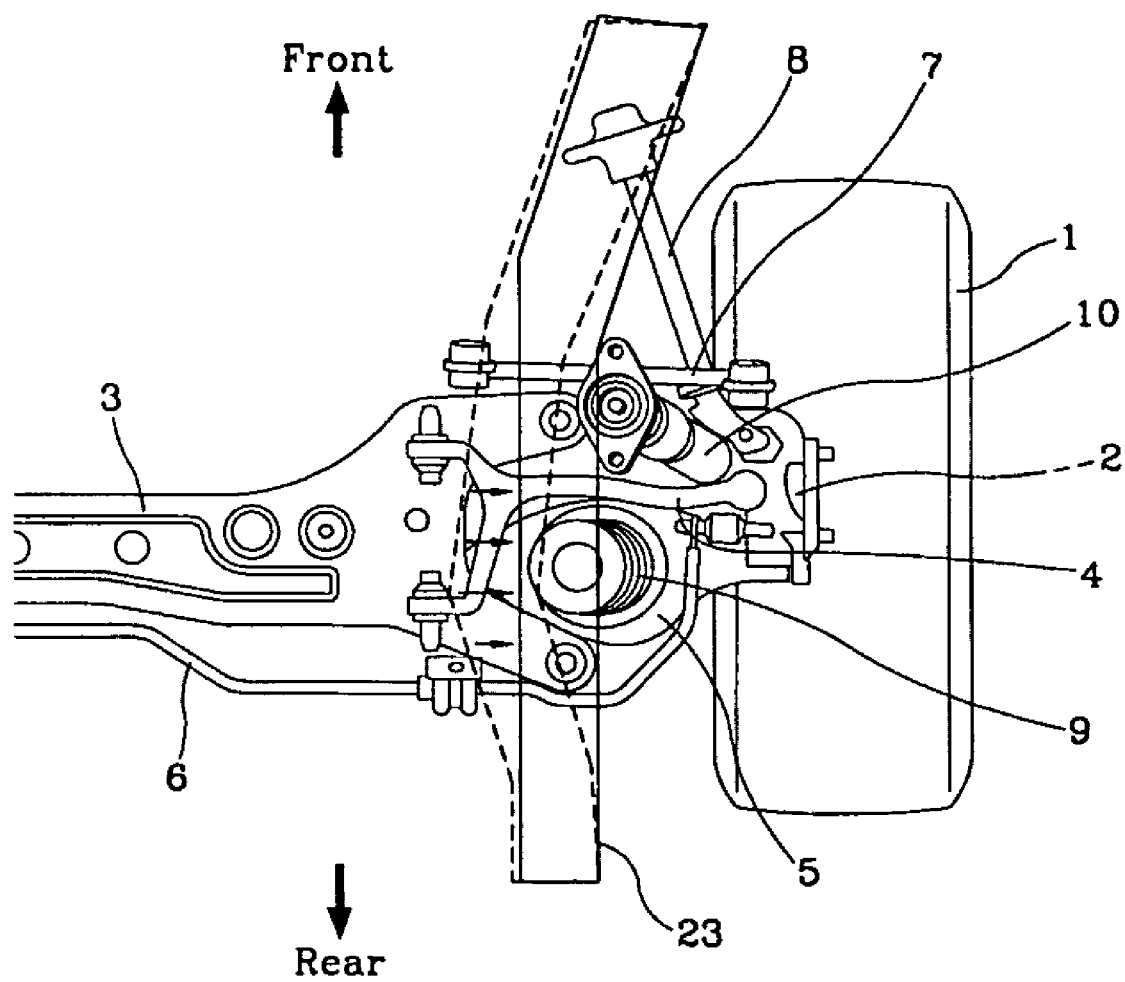
FIG. 6 is a top view that illustrates a linear side member of a rear suspension system according to an embodiment of the present invention.

As upper arm 4 is located lower than the conventional double wishbone type, and coil spring 9 and shock absorber 10 are distantly apart from each other, a side member 23 conventionally bent to avoid interruption with the upper arm and shock absorber inserted into the coil spring can be straightened in the present invention as shown in FIG. 6.

When a rear vehicle collision occurs, absorbing ability of impact energy greatly increases by the straightened side member 23, thereby increasing the safety of passengers in a vehicle.

The rear suspension system of the present invention is configured to align rear wheel 1 in a slight toe-in during braking for obtaining braking stability.

Figure 7:
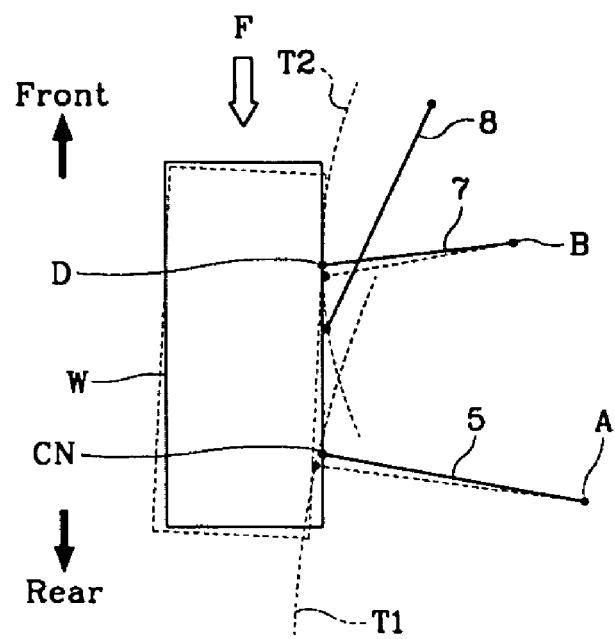
FIG. 7 is a conceptual view to delineate a toe-in adjustment of a rear wheel during braking.

While braking, external force (F) is applied to rear wheel 1 as shown in FIG. 7. Then, lower arm 5 tends to rotate in a counterclockwise direction along a trace (T1) in relation to a joint (A) with rear subframe 3. Assist arm 7 tends to rotate in a counterclockwise direction along a trace (T2) in relation to a joint (B) with rear subframe 3.

Thus, a joint (CN) of lower arm 5 and knuckle 2 inwardly moves toward rear wheel 1 (to the left in the drawing) along trace (T1). A joint (D) of assist arm 7 and knuckle 2 moves outwardly from rear wheel 1 (to the right in the drawing) along trace (T2).

Rear wheel 1 receiving external force (F) during braking is, therefore, inwardly aligned at the forward edge of the wheel (toe-in), thus obtaining a braking stability of the vehicle.

A rear outer wheel of a turning vehicle (hereinafter, a rear outer wheel) aligns in the toe-in by adjusting the elastic coefficient of assist arm mounting bushing 15 coupled to assist arm 7 with a smaller amount compared to the elastic coefficient of lower arm mounting bushing 31 coupled to lower arm 5 while a vehicle makes a turn and a lateral force is applied.

Lower arm 5 shifts inwardly slightly toward the vehicle body compared to assist arm 7 against the lateral force applied to the rear outer wheel, causing a toe-in.

Toe-in induces an understeer in a vehicle, helping to obtain a turn stability.

However, the toe-in characteristic of the rear outer wheel obtained only by transforming assist arm mounting bushing 15 may be insufficient against major lateral force during a sharp turn of the vehicle at a high speed.

Figure 8:
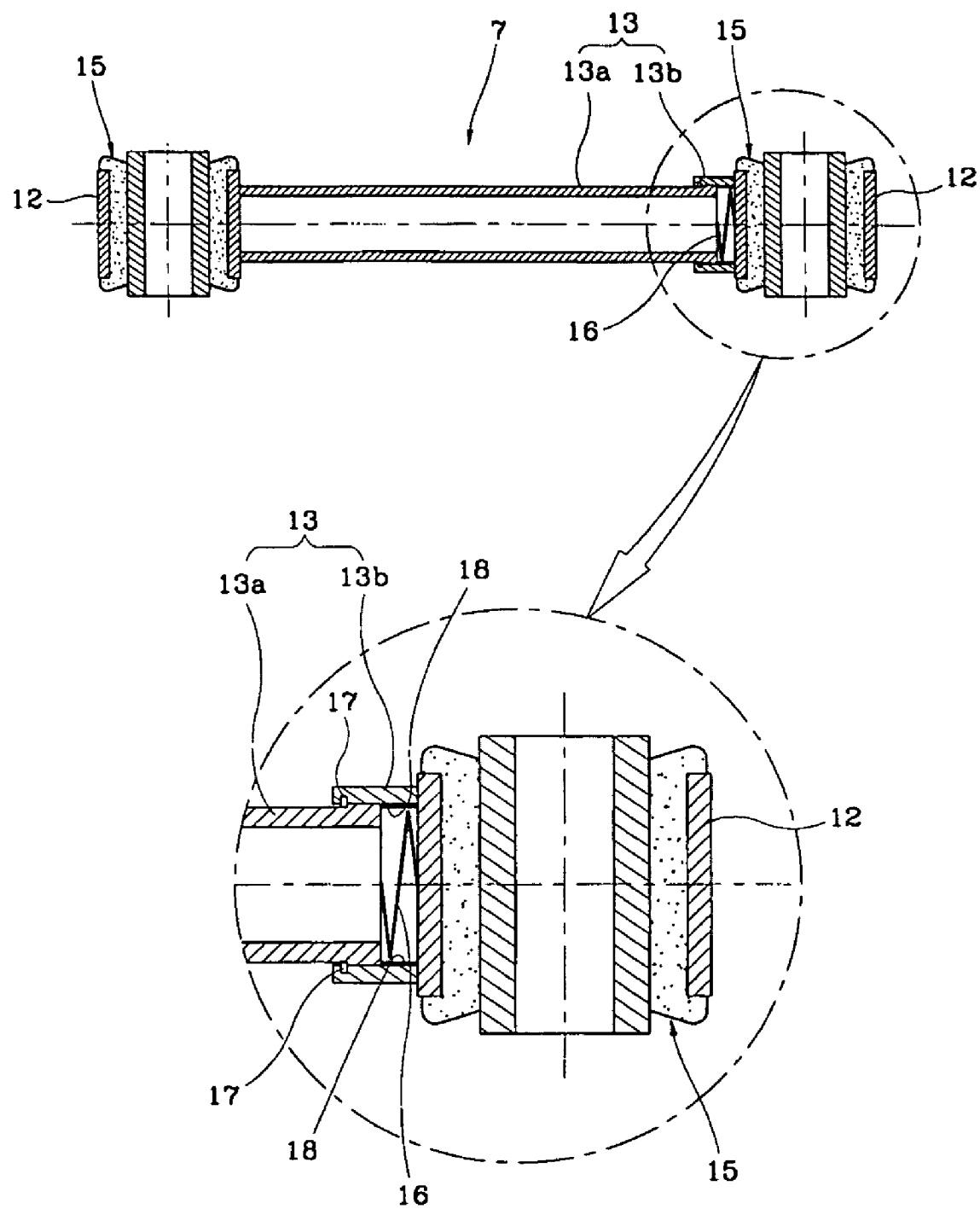
FIG. 8 is a schematic view of an assist arm.
Figure 9:
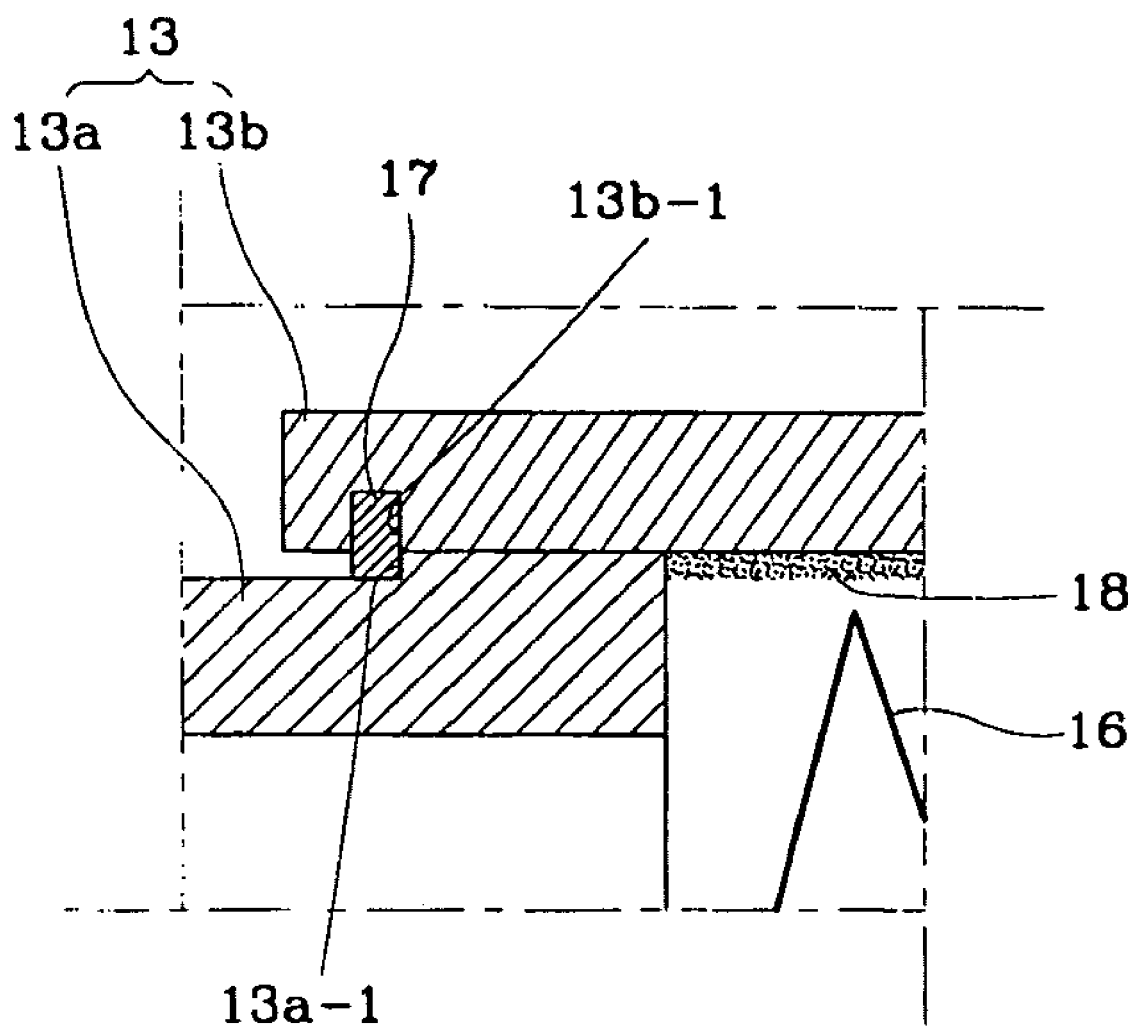
FIG. 9 is a detailed view that illustrates a principle part of FIG. 8.

In order to obtain a sufficient toe-in characteristic of the rear outer wheel even in case of a sharp turn at a high speed, a configuration of an assist arm to optimize the vehicle stability is illustrated in FIGS. 8 and 9.

Assist arm 7 is constituted by two bushing pipes 12 and a connecting rod 13. Two bushing pipes 12 are inserted into assist arm mounting bushings 15, respectively. Connecting rod 13 connects two bushing pipes 12. Connecting rod 13 is constituted by an assembly of an inner rod 13a and outer rod 13b that are engaged with each other for being changeable in length against external force. An elastic member 16 is mounted between one of bushing pipes 12 (which is at outer rod 13b) and one end of inner rod 13a. A snap ring 17 is installed at the inner surface of outer rod 13b to prevent separation of inner rod 13a. A blocking sill 13a-1 is formed at one end of inner rod 13a (disposed in outer rod 13b) to be blocked by snap ring 17.

The inner surface of outer rod 13b is coated with grease 18 as a lubricant to minimize friction with inner rod 13a.

Elastic member 16 can preferably be a compressed coil spring or plate spring. As elastic member 16 has a higher elastic coefficient than that of assist arm mounting bushing 15, elastic member 16 is transformed after a transformation of assist arm mounting bushing 15 against lateral force applied during a turn.

A ring installing groove 13b-1 having a rectangular cross-section is formed at the inner surface of one end of outer rod 13b. Snap ring 17 inserted into ring installing groove 13b-1 prevents separation of inner rod 13a by being blocked with blocking sill 13a-1 of inner rod 13a.

The multi-link rear suspension system having assist arm 7 thus constructed is configured to transform only assist arm mounting bushing 15 during a normal turn for a toe-in of the rear outer wheel. If a greater lateral force is applied to the rear outer wheel due to a sharp turn at a high speed, both assist arm mounting bushing 15 and elastic member 16 are transformed, and connecting rod 13 is shortened in length to obtain a sufficient toe-in characteristic of the rear outer wheel, thereby effectively improving the turning stability.

As apparent from the foregoing, there is an advantage in that the space of the trunk room is greatly multiplied, road impact and vibration are reduced in transmission toward the vehicle body, resulting in noise reduction, and improvement of ride comfort, braking stability and turn stability.

What is claimed is:

1. A multi-link rear suspension system for a vehicle, comprising:
    a knuckle disposed within an internal space of a rear wheel;
    a rear subframe positioned along a width direction of the vehicle, said rear subframe increasing stiffness of a lower portion of a vehicle body by being coupled to the vehicle body;
    an upper arm with an end disposed in said internal space of said rear wheel for being coupled to an upper end of said knuckle, an opposite end of said upper arm being coupled to said rear subframe;
    a lower arm placed underneath said upper arm, one end of said lower arm being positioned in said internal space of said rear wheel to couple with a lower end of said knuckle while an opposite end couples to said rear subframe;
    an assist arm located toward a front of the vehicle body in relation to said rear subframe, one end of said assist arm being coupled to said knuckle and an opposite end being coupled to said rear subframe;
    a trailing arm disposed underneath said assist arm along an anteroposterior direction of the vehicle body, one end of said trailing arm being coupled to said knuckle and an opposite end thereof being coupled to a vehicle body;
    a coil spring fixed at a lower end thereof by being inserted into a fixing groove formed on said lower arm, an upper end of said coil spring being coupled to a vehicle body; and
    a shock absorber slopedly disposed at a predetermined offset angle $\theta 1$ from a central axis that passes through a center of said rear wheel in a vertical direction in relation to a roadway, a lower end of said shock absorber passing through a space between said lower arm and said assist arm for being coupled to said knuckle, and an upper end of said shock absorber being coupled to a vehicle body;
    wherein assist arm mounting bushings equipped at both ends of said assist arm and coupled to said knuckle and said rear subframe, respectively, have a lower elastic coefficient than that of lower arm mounting bushings equipped at both ends of said lower arm and coupled to said knuckle and said rear subframe, respectively;
    wherein said assist arm is constituted by:
        two bushing pipes inserted into said assist arm mounting bushings; and
        a connecting rod connecting said two bushing pipes, wherein
            said connecting rod is constituted by an assembly of an inner rod and an outer rod that are engaged with each other for being changeable in length against external force;
            an elastic member is mounted between one of said bushing pipes at said outer rod and one end of said inner rod;
            a snap ring is installed at an inner surface of said outer rod to prevent separation of said inner rod; and
            a blocking sill is formed at one end of said inner rod to be blocked by said snap ring.

2. The system as defined in claim 1, wherein one end of said upper arm coupling to said rear subframe branches out to a front end and a rear end, and said front end and said rear end are fixed to said rear subframe via bushings.

3. The system as defined in claim 1, wherein said shock absorber is tilted toward a front of the vehicle at said offset angle $\theta 1$.

4. The system as defined in claim 1, wherein a linear length connecting centers of both ends of said lower arm is formed longer than a linear length connecting centers of both ends of said assist arm.

5. The system as defined in claim 4, wherein said lower arm is mounted in such a way that one end coupling to a lower portion of said rear subframe is in a shifted state toward a rear of the vehicle body compared to the other end thereof coupling to said knuckle in relation to a central axis connecting centers of said rear wheels in a lateral direction of the vehicle.

6. The system as defined in claim 5, wherein said assist arm is mounted in such a way that one end coupling to a lateral side of said rear subframe is in a shifted state toward a front of the vehicle body compared to the other end coupling to said knuckle in relation to said central axis connecting centers of said rear wheels in a lateral direction of the vehicle.

7. The system as defined in claim 6, wherein said lower arm and said assist arm form offset angles $\theta 2$, $\theta 3$ in relation to said central axis, and said offset angle $\theta 2$ of said lower arm is greater than said offset angle $\theta 3$ of said assist arm.

8. The system as defined in claim 6, wherein said shock absorber is coupled to a lower portion of said knuckle.

9. The system as defined in claim 1, wherein said inner surface of said outer rod is coated with a lubricant to minimize friction with said inner rod.

10. The system as defined in claim 9, wherein said lubricant is grease.

11. The system as defined in claim 1, wherein said elastic member has a higher elastic coefficient than that of said assist arm mounting bushings.

* * * * *